US010679320B1

United States Patent
Kunz

(10) Patent No.: US 10,679,320 B1
(45) Date of Patent: Jun. 9, 2020

(54) HIGH DYNAMIC RANGE SENSOR SYSTEM WITH ROW INCREMENT OPERATION

(71) Applicant: Ambarella International LP

(72) Inventor: Robert C. Kunz, Sunnyvale, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/042,466

(22) Filed: Jul. 23, 2018

(51) Int. Cl.
| | |
|---|---|
| *H04N 1/21* | (2006.01) |
| *G06T 1/60* | (2006.01) |
| *G06T 1/20* | (2006.01) |
| *G06T 5/00* | (2006.01) |
| *G06T 3/40* | (2006.01) |
| *H04N 5/235* | (2006.01) |
| *G06T 7/11* | (2017.01) |

(52) U.S. Cl.
CPC .............. *G06T 1/60* (2013.01); *G06T 1/20* (2013.01); *G06T 3/4023* (2013.01); *G06T 5/007* (2013.01); *G06T 7/11* (2017.01); *H04N 5/2355* (2013.01)

(58) Field of Classification Search
CPC ....................................................... G06T 1/60
USPC ......................................................... 345/530
See application file for complete search history.

(56) References Cited

U.S. PATENT DOCUMENTS

| | | | | | |
|---|---|---|---|---|---|
| 6,005,681 | A | * | 12/1999 | Pollard .................. | H04N 1/047 358/473 |
| 6,285,790 | B1 | * | 9/2001 | Schwartz ............... | H04N 1/644 382/234 |
| 8,428,137 | B2 | * | 4/2013 | Nitta ...................... | H04N 19/61 348/699 |
| 2003/0115403 | A1 | * | 6/2003 | Bouchard ........... | G06F 13/1647 711/5 |
| 2008/0126914 | A1 | * | 5/2008 | Ikeda .................. | H03M 13/271 714/763 |
| 2016/0104416 | A1 | * | 4/2016 | Taguchi ................... | G09G 3/32 345/690 |
| 2016/0127598 | A1 | * | 5/2016 | Yaguchi ............... | H04N 1/2112 348/231.99 |

OTHER PUBLICATIONS

Binary Image Analysis, computer vision year 2000.*

* cited by examiner

*Primary Examiner* — Javid A Amini
(74) *Attorney, Agent, or Firm* — Christopher P. Maiorana, PC

(57) ABSTRACT

An apparatus includes a memory and a processor. The memory generally comprises a first memory buffer and a second memory buffer. The first and the second memory buffers may be independent of each other. The processor may be configured to store image data for a plurality of image frames in the memory. Each frame generally comprises a plurality of exposure regions having different exposure levels. The processor stores image data of all of the exposure regions for a particular image frame in one of the memory buffers along with respective overlap regions. The overlap regions are generated by the processor performing a row increment operation based upon symbols in an image data stream.

20 Claims, 8 Drawing Sheets

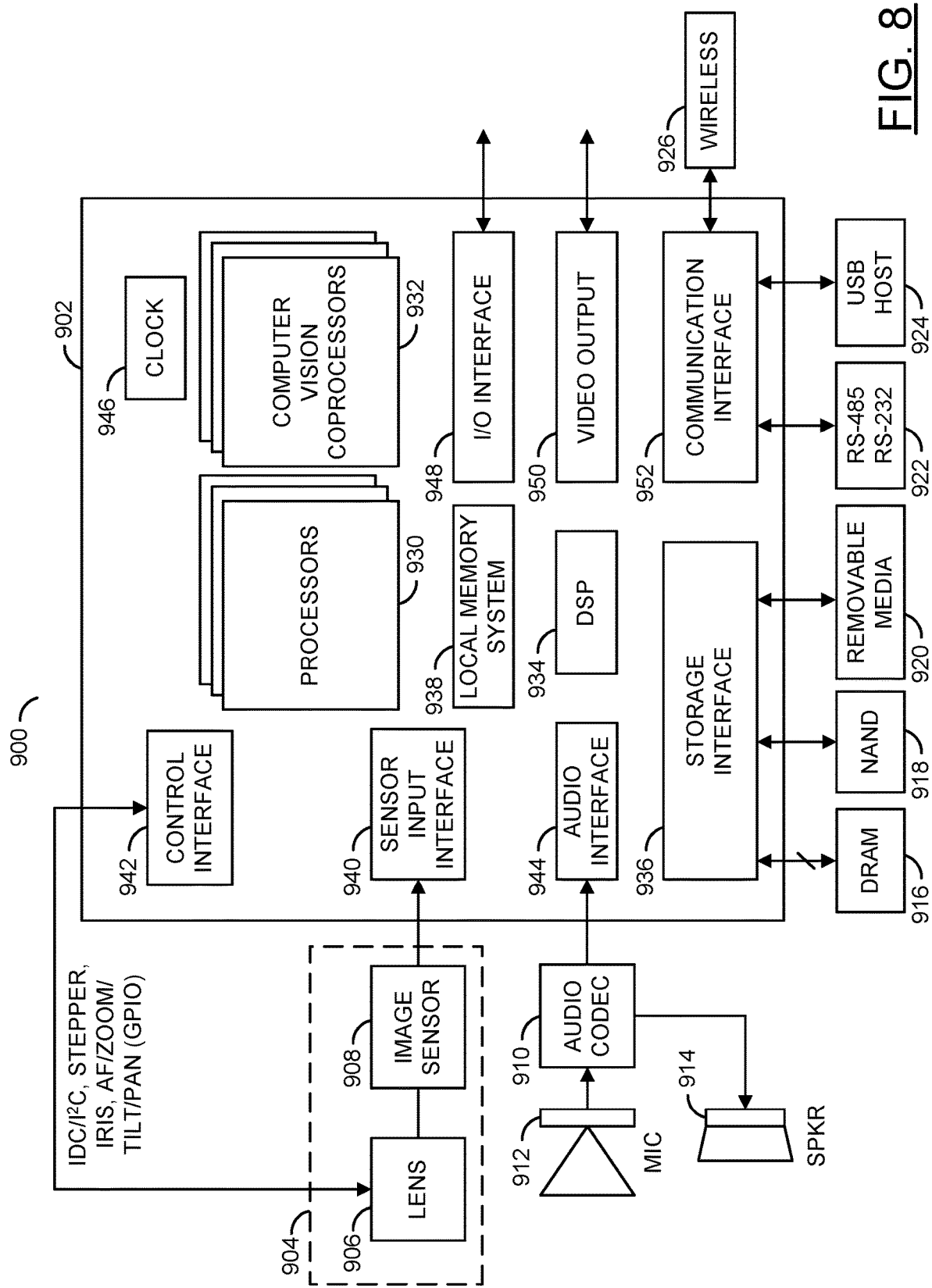

HIGH DYNAMIC RANGE SENSOR SYSTEM WITH ROW INCREMENT OPERATION

FIELD OF THE INVENTION

The invention relates to image sensors generally and, more particularly, to a method and/or apparatus for implementing a high dynamic range sensor system with row increment operation.

BACKGROUND

A high dynamic range (HDR) sensor captures images across two or more exposure levels from the same scene during the same frame time (simultaneously). The two or more exposures are combined to form a single image with superior quality at both low and high light levels. The HDR sensor may combine the two or more images internally or store out each exposure separately to a digital signal processor (DSP) chip, which then blends the images. The latter approach gives users full control over the blending process.

An alignment problem may arise when the HDR sensor stores each exposure out to the DSP chip. Each exposure level is captured at the same time, but stored through a single interface port to the DSP chip. The HDR sensor typically stores out lines in an interleaved format. In a typical 2 exposure system, the HDR sensor stores one row of a long exposure image followed by one row of a shorter exposure image, followed by a row of the long exposure image, and so on. However, the image capture for each exposure level may not occur at the same time, so the sensor may store out different rows from the long and short exposures at any point and time. Another problem is that the exposures being stored out may also be from different frames within a limited range.

It would be desirable to implement a high dynamic range sensor system with row increment operation.

SUMMARY

The invention concerns an apparatus including a memory and a processor. The memory generally comprises a first memory buffer and a second memory buffer. The first and the second memory buffers may be independent of each other. The processor may be configured to store image data for a plurality of image frames in the memory. Each frame generally comprises a plurality of exposure regions having different exposure levels. The processor stores image data of all of the exposure regions for a particular image frame in one of the memory buffers along with respective overlap regions. The overlap regions are generated by the processor performing a row increment operation based upon symbols of an image data stream.

BRIEF DESCRIPTION OF THE FIGURES

Embodiments of the invention will be apparent from the following detailed description and the appended claims and drawings in which:

FIG. 8 is a diagram illustrating an example implementation of a camera system in accordance with an embodiment of the invention.

DETAILED DESCRIPTION OF THE EMBODIMENTS

Embodiments of the present invention include providing a high dynamic range sensor system with row increment operation that may (i) perform row increment operations instead of storing blanking interval data, (ii) implement independent image buffers for each frame, (iii) store each frame at a unique base address, (iv) eliminate sensor overlap regions, (v) allow a stateless transition between exposures, (vi) maintain an alignment of each exposure without increasing memory bandwidth, (vii) advance a current store position by a frame width to point to a next active row to store, (viii) only store to the memory system when active data is needed and issue row increment operations to ensure address accounting, and/or (ix) be implemented as one or more integrated circuits.

Figure 1:
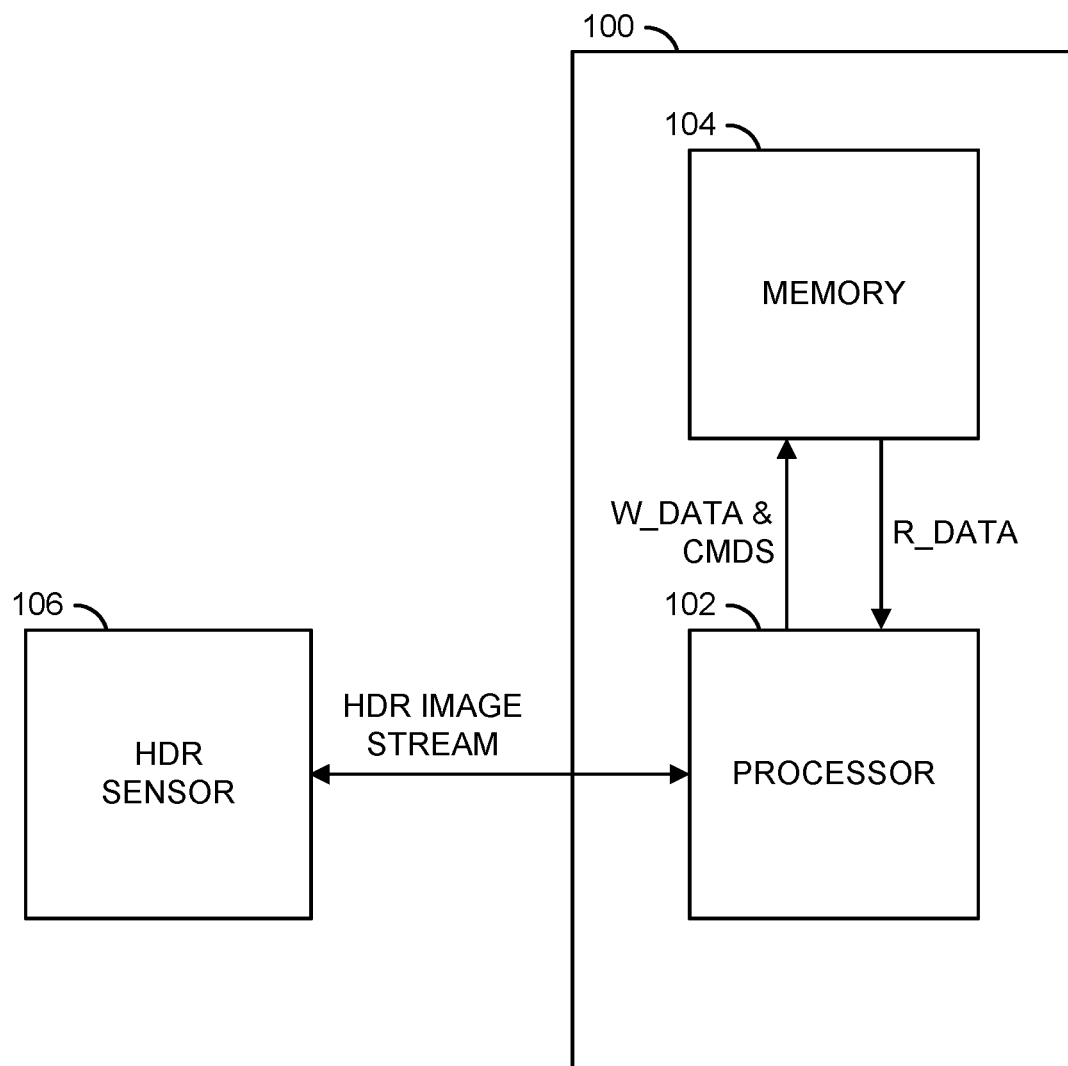
FIG. 1 is a diagram illustrating a high dynamic range (HDR) sensor system in accordance with an example embodiment of the invention.

Referring to FIG. 1, a diagram of a circuit 100 is shown illustrating a high dynamic range (HDR) sensor system in accordance with an example embodiment of the invention. In various embodiments, the circuit 100 may comprise a block (or circuit) 102 and a block (or circuit) 104. The block 102 may implement a processor circuit. The block 104 may implement a memory circuit. In an example, the block 102 may be configured as one or more of a digital signal processor (DSP), an image DSP, a video DSP, and/or a computer vision DSP. In an example, the block 104 may be implemented using one or more types of memory including, but not limited to, random access memory (RAM), dynamic random access memory (DRAM), synchronous DRAM, and/or flash memory. In various embodiments, the block 104 may be implemented separately from (external to) the block 102 (e.g., as off chip memory such as DRAM, etc.). In some embodiments (e.g., where an exposure size is small enough), the block 104 may be implemented using internal memory of the processor 102.

The block 102 may be connected to the block 104 by one or more busses. In an example, the blocks 102 and 104 may be connected by one or more parallel busses (e.g., address, data, and/or control busses). In another example, the blocks 102 and 104 may be connected using one or more serial busses (e.g. I²C, SPI, etc.). In various embodiments, the block 102 may have a first input that may receive an image data stream (e.g., HDR IMAGE STREAM), a second input that may receive read data (e.g., R_DATA) from the block 104, and an output that may send write data (e.g., W DATA) and/or commands (e.g., CMDS) to the block 104. In an example, the image data stream HDR IMAGE STREAM may comprise image data. The image data stream HDR IMAGE STREAM may also comprise a number of symbols, or syntax elements, (e.g., SOF, EOF, etc.) identifying a beginning and an ending of each exposure and/or frame. In various embodiments, the commands CMDS sent by the block 102 to the block 104 may include, but are not limited to, write (e.g., store row or line), read (e.g., fetch row or line), and increment (e.g., row increment, etc.).

In an example, the circuit 100 may be connected either directly or via an interface (e.g., a USB interface) to a block 106. The block 106 may implement a high dynamic range (HDR) sensor. In an example, the block 100 may be implemented as part of a camera controller and the block 106 may be implemented as part of a high dynamic range camera. In another example, the blocks 100 and 106 may be implemented together in a single high dynamic range camera or sensor system. In various embodiments, the blocks 100 and 106 may be connected using a serial interface. In an example, the block 102 and the block 106 may be connected using a standard serial interface (e.g., I²C, SPI, USB, etc.). In another example, the block 102 and the block 106 may be connected using a Mobile Industry Processor Interface (MIPI) such as a camera serial interface (CSI) or CSI-2. In an example, the block 106 may be configured to send the signal HDR IMAGE STREAM to the block 100. The signal HDR IMAGE STREAM may be used to communicate high dynamic range image data. In an example, the signal HDR IMAGE STREAM may comprise a plurality of image frames, with each frame comprising a plurality of exposures, for storage and/or processing (e.g., combining).

In various embodiments, the block 102 may be configured to store data received from the block 106 to the block 104 and retrieve data from the block 104 for processing. In an example, the block 104 may be configured as a plurality of memory buffers. In an example, the number and size of the memory buffers implemented in the block 104 may correspond to a number of frames and a number of exposures per frame provided by the sensor 106 that are to be stored. In various embodiments, the block 102 may be configured to manage the memory buffers implemented in the block 104 by issuing, inter alia, row increment and store line commands to the block 104. The row increment commands may allow the processor 102 to minimize the costs (e.g., area, circuit complexity, etc.) involved in utilizing the memory 104 to store multiple exposures per frame.

Figure 2:
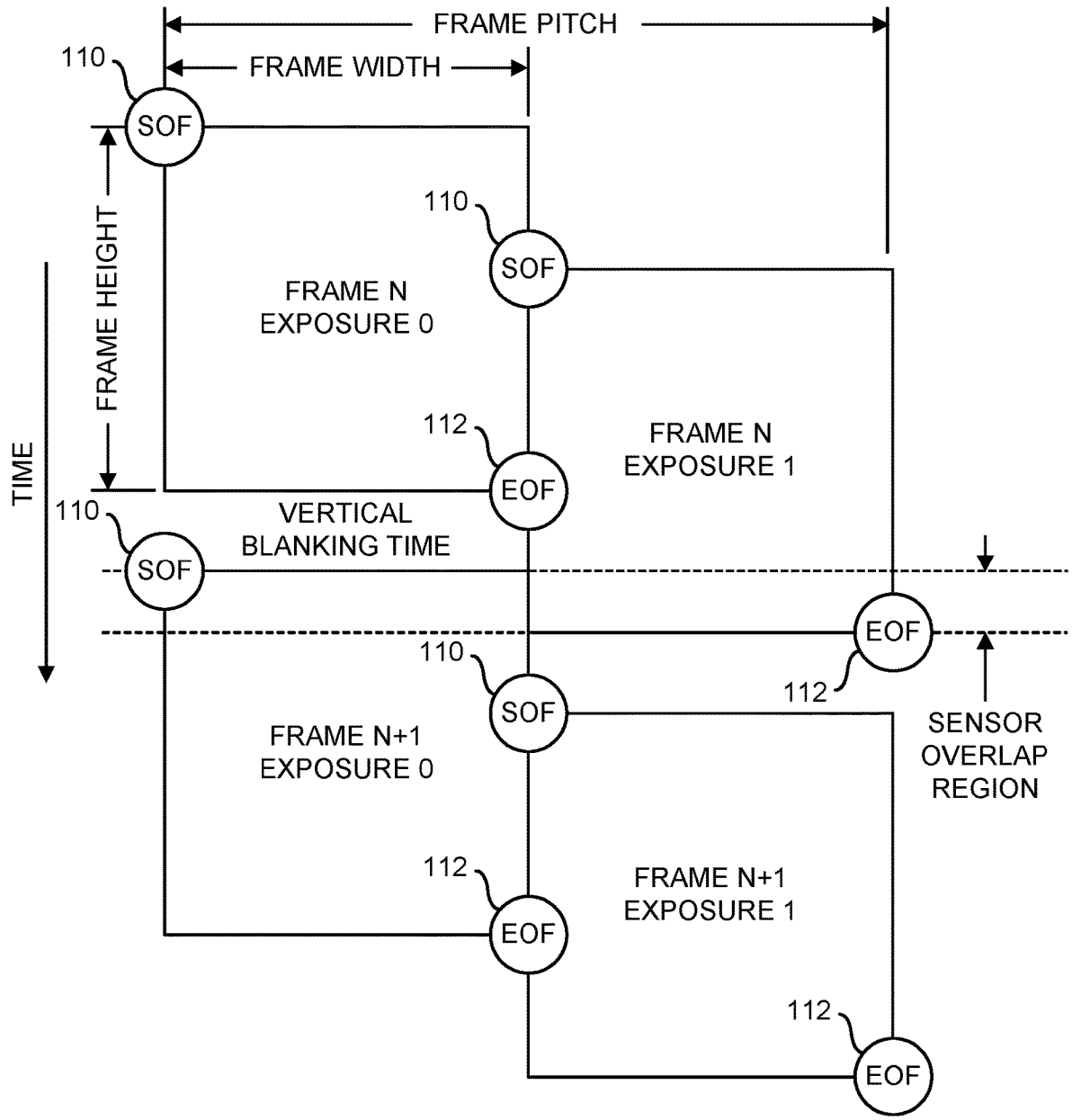
FIG. 2 is a diagram of a two exposure example illustrating an output of a high dynamic range sensor.

Referring to FIG. 2, a diagram is shown illustrating an example of a high dynamic range image stream with two exposure levels. In an example, the two exposure levels (e.g., Exposure 0 and Exposure 1) of a first frame (e.g., N) may be captured by the sensor 106 at the same time (simultaneously), but stored through a single interface port to the processor 102. In general, multiple exposure levels for a given frame need to be captured at nearly the same time and at the same depth in order to be blended into a final HDR image. Any significant motion may show up as visual artifacts in a finished picture.

In an example, the sensor 106 may store out lines in an interleaved format. For example, in a two exposure system, the sensor 106 may store one row of a long exposure (e.g., Exposure 0) followed by one row of a short exposure (e.g., Exposure 1), followed by a row of the long exposure, and so on. The beginning of each exposure may be marked (or indicated) by a start of frame (SOF) element (or symbol) 110. The end of each exposure may be marked (or indicated) by an end of frame (EOF) element (or symbol) 112. In another example, the capture of each exposure level may not occur at the same time, so the sensor 106 may store different rows from the long and short exposures at any point and time. Each exposure may also be stored out from different frames (e.g., N, N+1, etc.). In an example, the number of different frames may be kept within a limited range.

In an example, a frame size is generally represented by two values: a "Frame Width" and a "Frame Height". Each row of each exposure is "Frame Width" wide. The frame height generally corresponds to the number of rows in each exposure. In various embodiments, a pitch for storing the exposure frames (e.g., Frame Pitch) is generally equal to or greater than the number of exposures (e.g., in this case 2) multiplied by "Frame Width". In an example, the frame pitch may be implemented wider than the number of exposures multiplied by the frame width for better alignment when fetching data from memory (e.g., either internal or external). As long as the memory pointers are incremented by the pitch, each row will always be aligned, even in the presence of padding. Each exposure is complete when a respective End-of-Frame (EOF) symbol 112 is generated (e.g., either stored as part of the pixel data, signaled as a reserved symbol, or signaled on a separate sensor pin). The entire frame (e.g., Frame N) is complete when EOF symbols 112 for all the exposures (e.g., Exposure 0 and Exposure 1 in the two exposure case) arrive at the processor 102.

Between each frame, there is a vertical blanking interval (time). The sensor 106 may either store blank pixels out to the processor 102 or send nothing during the blanking interval time (e.g. MIPI sensors). The blanking periods for each exposure do not generally align. In various embodiments, the blanking time may either be determined by the sensor 106 (e.g., when configured) or be directly controlled (e.g., in a master mode) by the processor 102 (e.g., by telling the sensor 106 what blanking interval to use). When the blanking time is determined by the sensor 106, the blanking time may be dictated by factors other than ones directly controlled by the processor 102. However, the blanking time may be controlled indirectly (e.g., through software or firmware executed on the processor 102) by adjusting settings of the sensor 106.

In an example, the frames are generally stored in the memory 104 and processed later by the processor 102 (e.g., to blend the exposures, etc.). During processing, a single exposure may be extracted by setting an address pointer to a base address of the first pixel in the first exposure of a frame, and setting the pitch to match the "Frame Pitch". In an example, only a "Frame Width" number of pixels are read and then the processor 102 skips the remaining pixels on the row to reach the next line of the exposure. This approach only works well if both exposures are continuous in the memory 104.

The long exposure may start processing the next frame (e.g., frame N+1), before the later exposures of the frame N reach their respective EOF symbols 112. This skew causes an overlap (e.g., the "Sensor Overlap Region" in FIG. 2), where both the frame N and the frame N+1 are active concurrently (or simultaneously or at the same time). In an example, the memory 104 may implement a circular frame buffer for holding the frames. In general, the circular frame buffer implemented by the memory 104 is bounded in size to reduce the memory needs, yet large enough to handle the active working set of the processor 102. The boundary between each frame needs to be distinct and each frame held (stored) continuously (otherwise the access patterns become significantly more complex).

In general, any sensor overlap region may cause a problem. In an example, the part of the frame stored early (e.g. frame N+1, (long) exposure 0 (e.g., inside the "Sensor Overlap Region" in FIG. 2) may be at the end of a circular buffer implemented in the memory 104, while the remaining portion of the frame N+1 is at the beginning of the circular buffer. To read the frame properly, the processor 102 needs to track where the sensor overlap region started and ended, and know to adjust memory positions (pointers) when the sensor overlap ends. However, this increases hardware complexity significantly. In an example, row increment operations during the blanking period are optional if the sensor 106 sends side-band or meta data within the blanking interval. In this case, the row increment operations only occur during the sensor overlap region.

Figure 3:
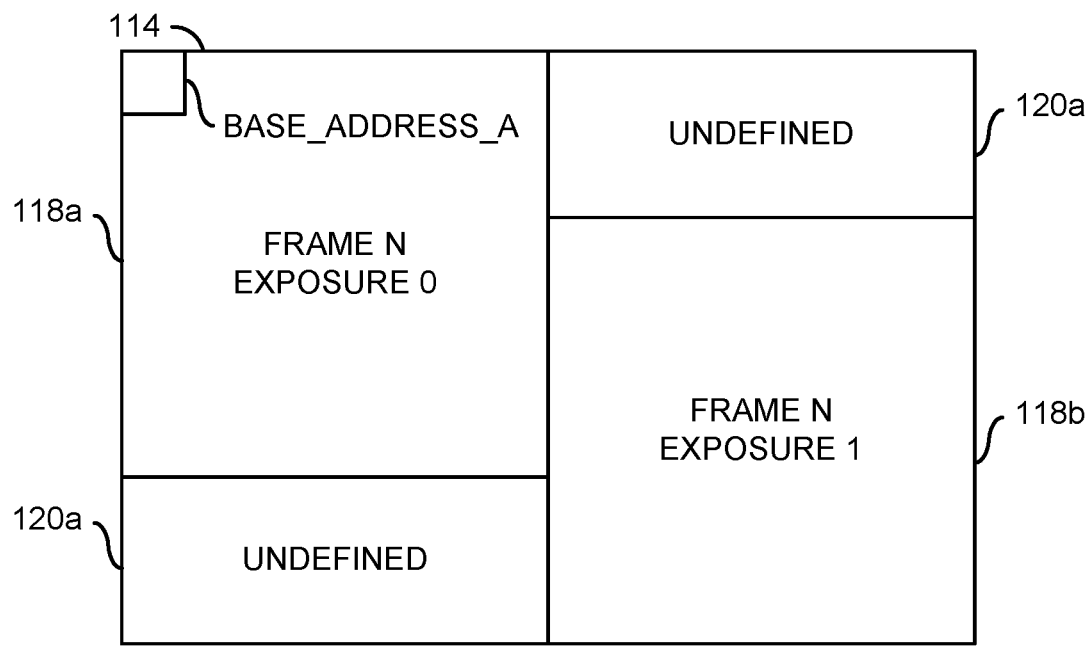
FIG. 3 is a diagram illustrating a two memory buffer example in accordance with an example embodiment of the invention.
Figure 3:
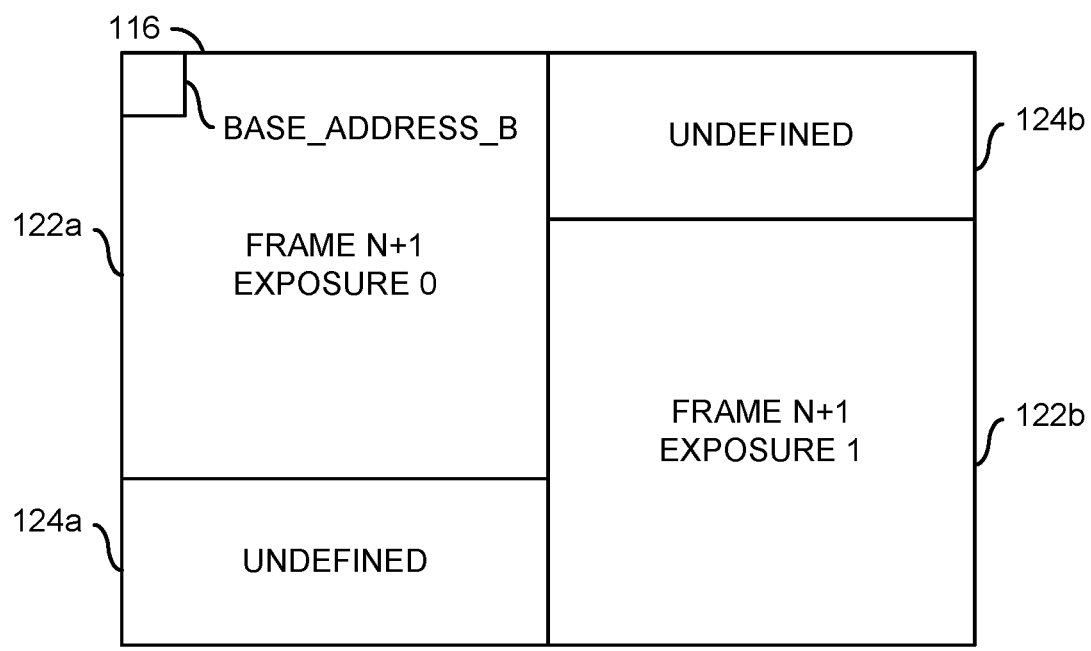

Referring to FIG. 3, a diagram is shown illustrating a memory storage structure (architecture) in accordance with an example embodiment of the invention. In an example embodiment, each frame may be stored in an independent buffer in the memory 104. In an example, the memory 104 may be configured as two memory buffers 114 and 116. Each frame may be stored in a respective one of the buffers 114 and 116 starting at a unique base address. In an example, the frame N may be stored in the buffer 114 with a first base address (e.g., Base_Address_A) and the frame N+1 may be stored in the memory buffer 116 starting at a second base address (e.g., Base_Address_B). The memory buffer 114 may comprise active data regions 118a and 118b, and undefined data regions 120a and 120b. The memory buffer 116 may comprise active data regions 122a and 122b, and undefined data regions 124a and 124b. The active data regions 118a and 118b may store Exposure 0 and Exposure 1, respectively, of frame N. The active data regions 122a and 122b may store Exposure 0 and Exposure 1, respectively, of frame N+1. The implementation of the undefined data regions 120a, 120b, 124a, and 124b generally eliminates the "Sensor Overlap Region", but at the cost of some unused memory.

In an ideal case, the undefined region would be completely eliminated to avoid wasting memory space, which would simplify the software management because there would be no skew between each exposure. However, to achieve the ideal case, context per-exposure would be needed, and the context generally switches at each transition point. In various embodiments, a stateless transition between exposures may be provided at the cost of extra memory to hold the undefined data regions 120a, 120b, 124a, and 124b.

In an example, a simple solution may be to use two physical streams to the memory 104, one for frame N, and one for frame N+1, and then swap between the two streams at each of the frame boundaries. However, this approach adds hardware cost of the extra stream logic, plus bandwidth cost. During the "Sensor Overlap Region", the processor 102 needs to store the blanking period for frame N+1 and the active period for frame N to memory to ensure proper alignment in the memory system to allow exposure extraction. In various embodiments, two objectives may be accomplished without adding an extra stream:

1) each frame may be stored to an independent region (buffer) of the memory 104 (e.g., as illustrated in FIG. 2); and 2) the proper alignment of each exposure may be maintained without increasing memory bandwidth.

In various embodiments, a row increment (e.g., "Row Inc") operation is introduced to the memory system 104. The Row Inc operation advances the current store position (e.g., write pointer) by the "Frame Width" value to point to the next active row to store. In a two exposure example, during the "Sensor Overlap Region", only one sensor is active at a time and there is only one physical port. Any data in the blanking period is not needed for any processing by the processor 102. The processor 102 only stores to the memory system 104 when active data is needed and issues Row Inc operations to ensure address accounting is handled properly.

When the processor 102 is programmed to store frame N, software may provide the base address "Base_Address_A" of the memory buffer 114 (e.g., "Frame Buffer A") and the base address "Base Address B" of the memory buffer 116 (e.g., "Frame Buffer B"). Active rows initially store out to the memory system 104 in a typical fashion. When the processor 102 switches to a new exposure that is currently in a blanking state (either storing blanking pixels or inactive), the processor 102 issues a Row Inc operation to skip ahead to the next line in the memory system 104 (e.g., by advancing a memory pointer by the "Frame Width" value) and then advances to the next exposure. If there are more than two exposures, many row increment operations may occur back-to-back to advance to the next active exposure.

Figure 4:
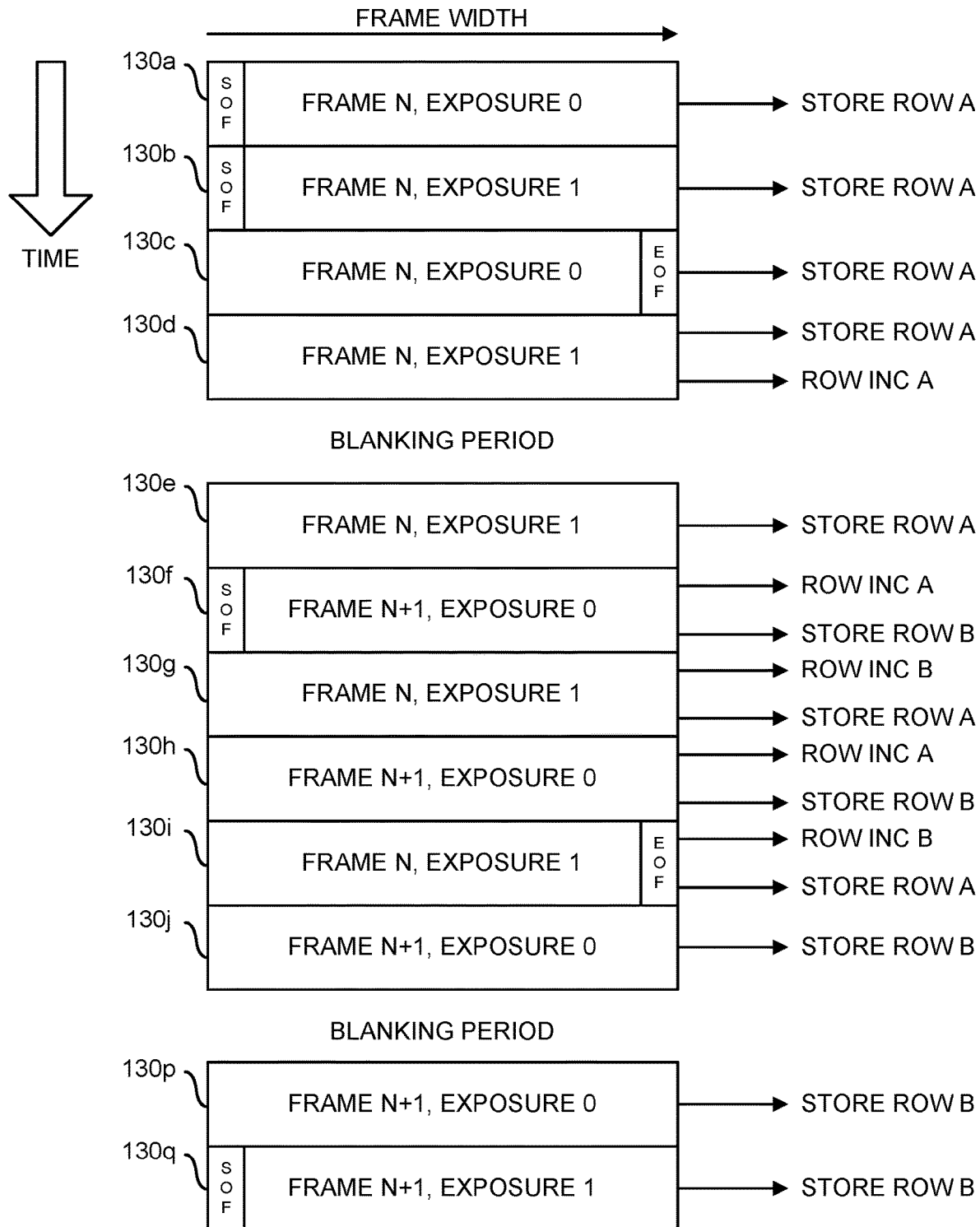
FIG. 4 is a diagram illustrating a row store/increment process in accordance with an example embodiment of the invention.

Referring to FIG. 4, a diagram is shown illustrating an example of store line and row increment operations during a frame transition. Initially, both exposures (e.g., Exposure 0 and Exposure 1) are actively storing data out to "Frame Buffer A". When Exposure 0 generates an end of frame (EOF), the processor 102 enters the blanking period until a start-of-frame (SOF) is received for frame N+1. Exposure 1 of frame N is stored to Frame Buffer A, and then the processor 102 switches to Exposure 0. However, Exposure 0 of frame N is in the blanking period and inactive, so the processor 102 issues or a Row Inc operation to Frame Buffer A to skip ahead. This pattern repeats until active data arrives for on Exposure 0 of Frame N+1.

At that point, Exposure 0 (of frame N+1) becomes active again, but the processor 102 stores new data to the first row of Frame Buffer B. While storing out the first row to Frame Buffer B, the processor 102 also issues a Row Inc operation to Frame Buffer A (e.g., "Row Inc A") to advance the memory pointer in Frame Buffer A. In general, the row increment operation itself stores no data to the memory system 104, so no extra memory bandwidth is generated, and the next active exposure for frame N appears in the proper place in Frame Buffer A. After the first line of Frame N+1 to Frame Buffer B finishes, the processor 102 switches to Exposure 1 for Frame N. Exposure 1 of Frame Buffer B is inactive, so the processor 102 issues a Row Inc operation to Frame Buffer B (e.g., "Row Inc B"), and stores the next line to Frame Buffer A. During this overlap region, there is always a Row Inc operation issued to the inactive exposure to ensure that the alignment of the active regions follow FIG. 2. The pattern completes when each exposure from Frame N hits EOF. Frame Buffer B becomes the active frame, replacing Frame Buffer A.

The processor 102 only needs the base address of Frame N+1 (e.g., "Base_Address_B") when the first EOF is received for Frame N from the sensor 106. If the processor 102 does not receive a new base address in time, the processor 102 may be configured to drop the frame and no stores to Frame Buffer B are needed. However, the processor 102 still issues a Row Inc operation on Frame Buffer A to avoid storing blanking data to the memory system.

Figure 5:
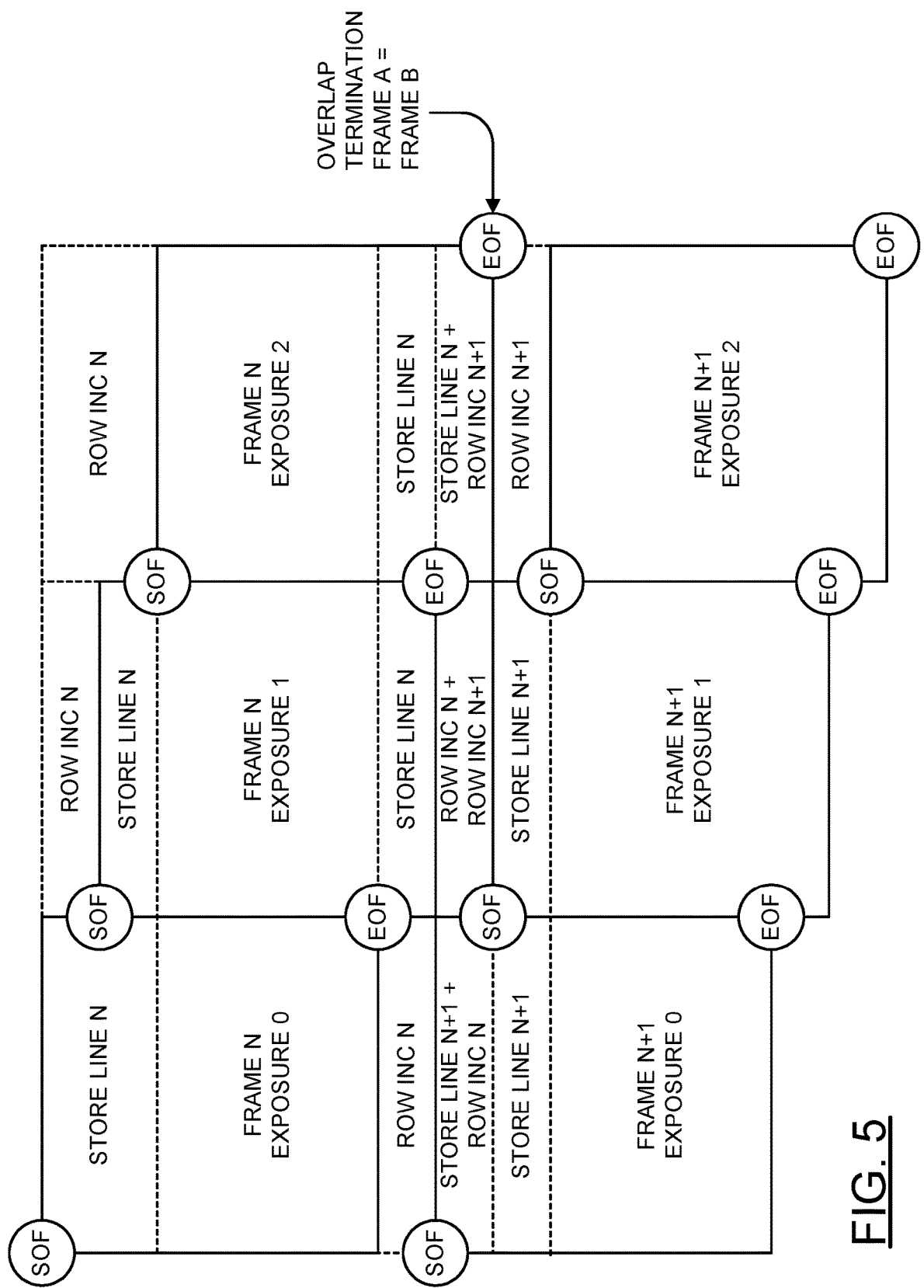
FIG. 5 is a diagram of a three exposure example illustrating an output of a high dynamic range sensor.

Referring to FIG. 5, a diagram is shown illustrating a three-exposure example in accordance with an example embodiment of the invention. In an example where the sensor 106 stores out three exposures per frame, the overlap region begins from the first line of Exposure 0 from Frame N+1 until the end of file (EOF) at Exposure 2 of Frame N. During the blanking period of Frame N, row increment operations are needed on both Frame N and N+1 to ensure that the alignment of Frame $N_{+1}$, Exposure 0 is properly aligned in memory (e.g., DRAM).

Row increment operations during the blanking period are optional if the sensor 106 sends side-band or meta data within the blanking interval. In this case, the row increment operations only occur during the "Sensor Overlap Region".

Figure 6:
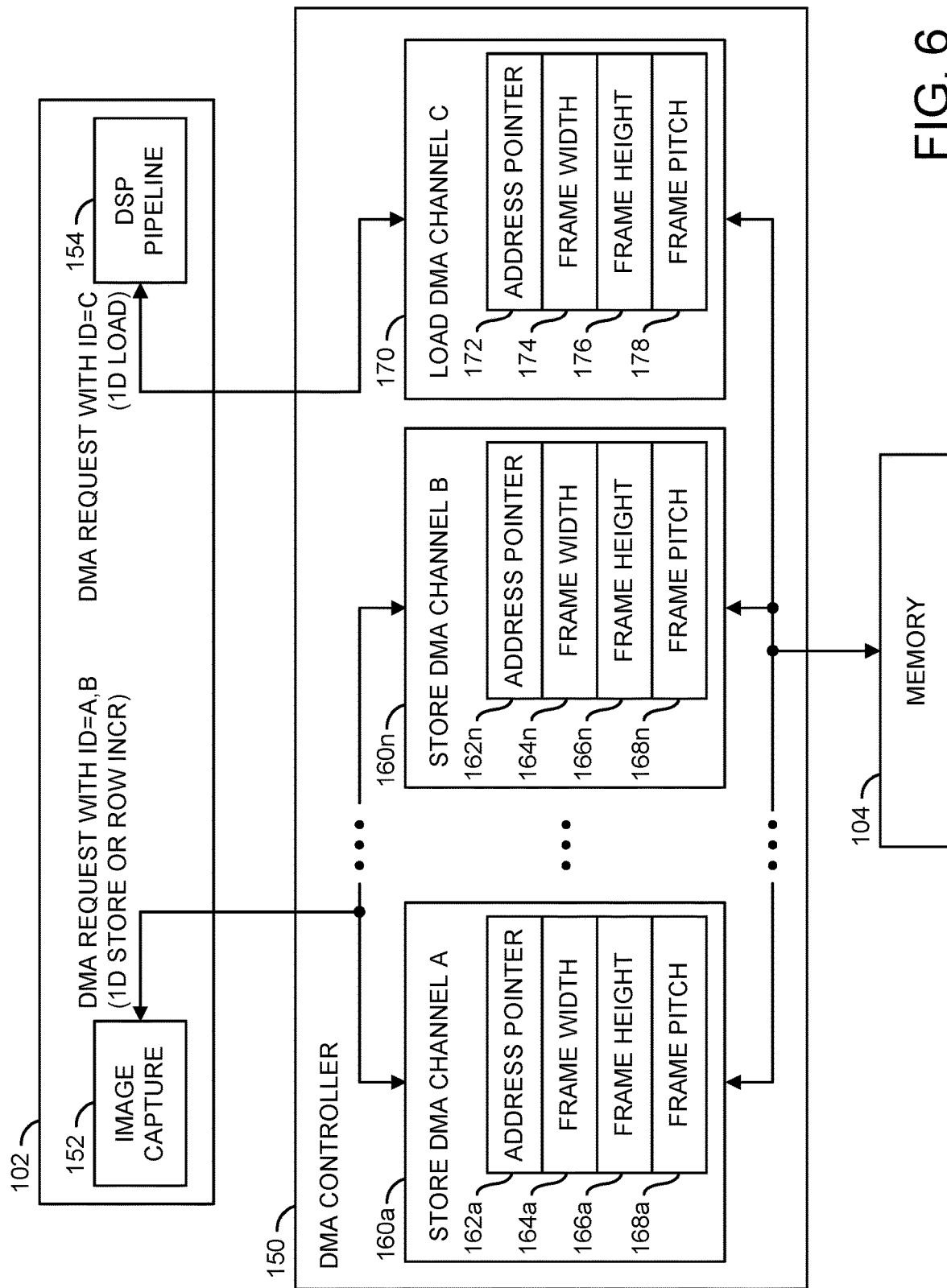
FIG. 6 is a diagram illustrating an example implementation of a data path of the HDR sensor system of FIG. 1.

Referring to FIG. 6, a diagram is shown illustrating an example implementation of a data path of the circuit 100 of FIG. 1 in accordance with an example embodiment of the invention. In an example, the circuit 100 may include a direct memory access (DMA) controller 150. In an example, the DMA controller 150 may be coupled between the processor 102 and the memory 104. In another example, the DMA controller 150 may be implemented as part of the processor 102 and configured to handle memory transfers between the processor 102 and the memory 104. In an example, the DMA controller 150 may be configured to handle image data storage related commands (e.g., 1D stores and row increments) and image data retrieval commands (e.g., 1D reads) from the processor 102 to the memory 104. In an example, the DMA controller 150 may be configured to implement a data storage architecture as described above in connection with FIGS. 2-5 using the memory 104.

In an example, the processor 102 may implement an block (or circuit) 152 and a block (or circuit) 154. In an example, the block (or circuit) 152 may implement an image capture process in accordance with an example embodiment of the invention. In an example, the block (or circuit) 154 may implement a digital signal processing (DSP) pipeline. In an example, the image capture process 152 may be implemented separately from the DSP pipeline 152. In an other example, the image capture process 152 may be integrated with (part of) the DSP pipeline 154. In various embodiments, the blocks (or circuits) 152 and 154 may be implemented in hardware, a combination of hardware and software, and/or simulated with software.

In an example, the block 152 may present image data storage related commands (e.g., 1D store and row increment) to the DMA controller 150. In an example, the image data storage related commands may be used to store HDR image data (e.g., received by the circuit 100 from the HDR sensor 106) in the memory 104. In an example, the block 152 may implement a state machine as described below in connection with FIG. 7. In general, the block 152 generates the row increment requests and the DMA controller 150 adjusts address pointers accordingly. Once the data is in the memory 104 and arranged in accordance with embodiments of the invention, further processing may be performed.

In an example, the block 154 may present image data retrieval related commands (e.g., 1D reads) to the DMA controller 150. In an example, the image data retrieval commands may be used to retrieve HDR image data from the memory 104 for processing by the DSP pipeline 154 implemented in (or by) the circuit 102. In an example, the DSP pipeline implemented by the block 154 blends the exposures of a particular frame together to generate a finished HDR image. Blending may be performed immediately after storing, or deferred until later.

In an example, the DMA controller 150 may be configured to implement (or control) a number of data transfer channels that may be used to store data to and/or fetch data from the memory 104. In an example, the DMA controller 150 may implement (or control) a number of data storage (or store) channels 160a-160n (e.g., STORE DMA CHANNEL A and STORE DMA CHANNEL B) and at least one data retrieval (or load) channel 170 (e.g., LOAD DMA CHANNEL C). Each of the channels 160a-160n and 170 implemented by the DMA controller 150 may be defined by values stored in a number of respective registers.

In an example, each data storage channel 160a-160n may have a respective first register 162a-162n storing an address pointer value, a respective second register 164a-164n storing a frame width value, a respective third register 166a-166n storing a frame height value, and a respective fourth register 168a-168n storing a frame pitch value. However, other registers may be implemented accordingly to meet the design criteria of a particular implementation. In an example, the DMA controller 150 may be configured to manage the address pointer values of each of the channels 160a-160n based upon 1D store and row increment commands received from the processor 102. For example, the DMA controller 150 may adjust the address pointer 162a-162n based upon the row increment requests received from the processor 102.

In an example, the at least one data retrieval channel 170 may have a respective first register 172 storing an address pointer value, a respective second register 174 storing a frame width value, a respective third register 176 storing a frame height value, and a respective fourth register 178 storing a frame pitch value. The DMA controller 150 may be further configured to manage the address pointer value(s) of the at least one retrieval channel 170 based upon 1D load commands received from the processor 102.

The DMA controller 150 generally writes (stores) data to the memory 104 based upon the registered values of each of the channels 160a-160n and reads data from the memory 104 based upon the registered values of the at least one channel 170. The DMA controller 150 generally accepts data from the image capture process implemented by the block 152 for storage in the memory 104 and fetches data from the memory 104 for presentation to a digital signal processing routine implemented by the block 154. In various embodiments, the DMA controller 150 may be configured to implement image data storage architectures in the memory 104 similar to the ones describe above in connection with FIGS. 2-5. In various embodiments, the architectures may be implemented (arranged) based upon values that are stored in registers (e.g., the registers 162a-162n, 164a-164n, 166a-166n, 168a-168n, 172, 174, 176, 178, etc.), which are defined, respectively, for each of the channels 160a-160n and 170.

Figure 7:
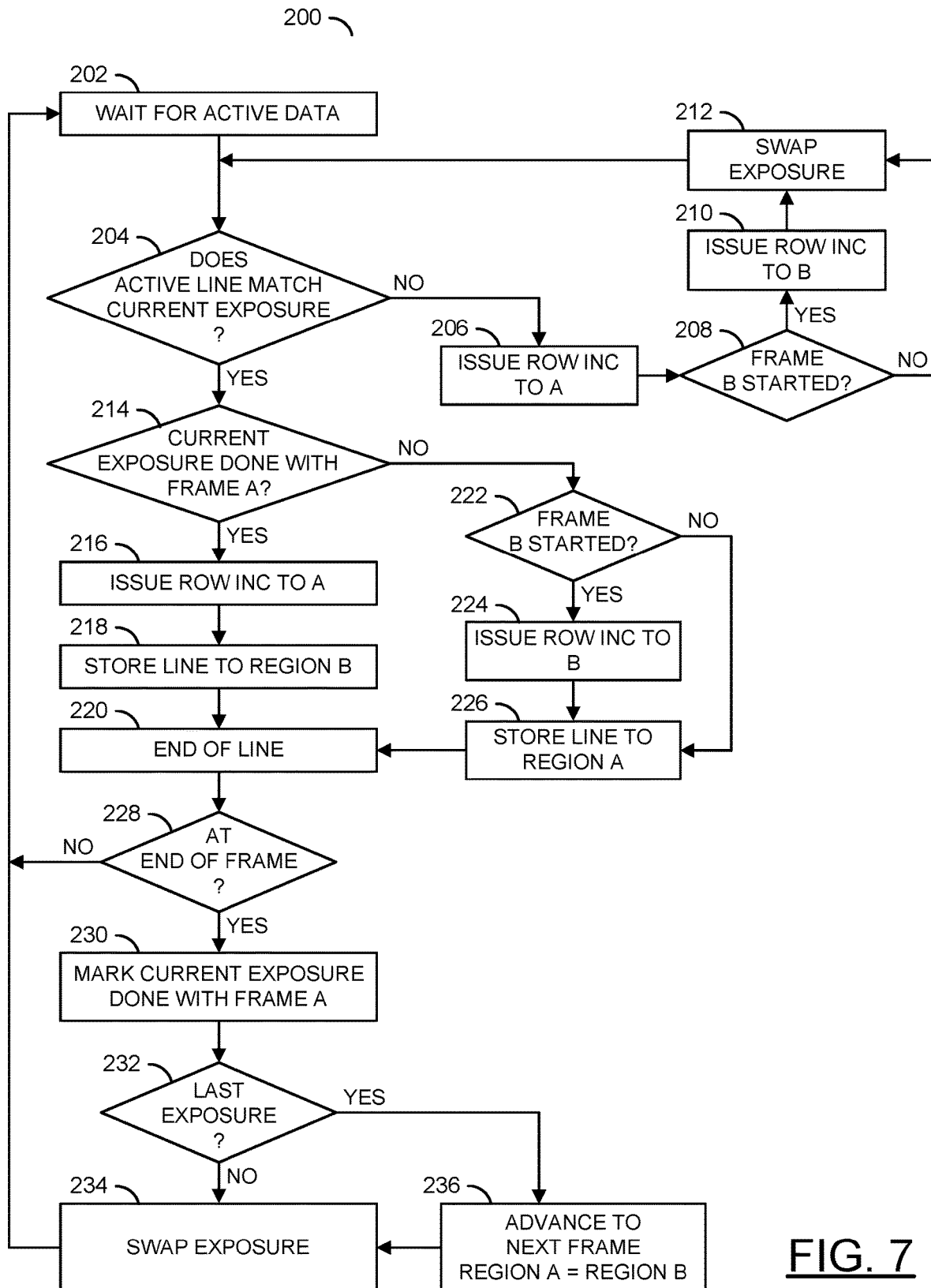
FIG. 7 is a diagram illustrating a state machine in accordance with an example embodiment of the invention.

Referring to FIG. 7, a diagram is shown illustrating an example implementation of a state machine 200 in accordance with an example embodiment of the invention. In an example, the state machine 200 may be configured to operate with two independent memory buffers (e.g., Buffer A and Buffer B). The state machine 200 may assume that when active data enters the processor 102 from the sensor 106, the active exposure is known and may be different than the current exposure being held internally (e.g., as in the MIPI-sensor case where no blanking pixels are sent). In an example, the state machine 200 may comprise a step (or state) 202, a step (or state) 204, a step (or state) 206, a step (or state) 208, a step (or state) 210, a step (or state) 212, a step (or state) 214, a step (or state) 216, a step (or state) 218, a step (or state) 220, a step (or state) 222, a step (or state) 224, a step (or state) 226, a step (or state) 228, a step (or state) 230, a step (or state) 232, a step (or state) 234, and a step (or state) 236. The steps 202-236 may be implemented by the processor 102 in hardware, software, firmware, and/or any combination thereof.

In the state 202, the state machine waits for active data. When active data is received, the state machine 200 moves to the state 204. In the state 204, the state machine 200 determines whether the active data (image line) matches a current exposure. If the active line does not match the current exposure, the state machine 200 moves to the state 206. In the state 206, the state machine 200 issues a row increment command to Buffer A and moves to the state 208. In the state 208, the state machine 200 determines whether frame B has been started. If frame B has not been started, the state machine 200 moves to the state 212. If frame B has been started, the state machine 200 moves to the state 210. In the state 210, the state machine 200 issues a row increment command to the Buffer B and moves to the state 212. In the state 212, the state machine 200 performs a Swap Exposure operation and moves to the state 202. In an example, the Swap Exposure operation advances to the next exposure (e.g., i=(i+1)/E, where i is the index of the current exposure and E is the total number of exposures).

If the state machine 200 determines in the state 204 that the active line does match the current exposure, the state machine 200 moves to the state 214. In the state 214, the state machine 200 determines whether the current exposure is done with frame A. If the current exposure is done with frame A, the state machine 200 moves to the state 216. In the state 216, the state machine 200 issues a row increment command to Buffer A and moves to the state 218. In the state 218, the state machine 200 issues a store line command to Buffer B and moves to the state 220. If, in the state 214, the current exposure is not done with frame A, the state machine 200 moves to the state 222. In the state 222, the state machine 200 determines whether frame B has been started. If frame B has not been started, the state machine 200 moves to the state 226. If frame B has been started, the state machine 200 moves to the state 224. In the state 224, the state machine 200 issues a row increment command to Buffer B and moves to the state 226. In the state 226, the state machine 200 issues a store line command to Buffer A and moves to the state 220.

In the state 220, the state machine 200 performs an end of line operation and moves to the state 228. The end of line operation generally comprises either a "Wait for End of Line" operation or "Receive End-of-Line Marker" operation. The processor 102 generally continues to process a line of data (pixels) for frame B (state 218) or frame A (state 226) until an end of line marker (or symbol) is received from the sensor 106. When the end of line marker is received, the processor 102 stops processing the line data for the particular frame and moves to the state 228 because the sensor is moving to the next exposure. In an example, the states 218 and 220 may be viewed as implementing a loop for storing pixels into the frame B buffer and the states 226 and 220 may be viewed as implementing a loop for storing pixels into the frame A buffer. The respective loops cycle until an "end of line" for the respective exposure is detected and then exit to the state 228 via the state 220 for a determination of whether the end of frame has been reached.

In the state 228, the state machine 200 determines whether the end of frame (e.g., EOF) has been reached. If the end of frame has not been reached, the state machine 200 returns to the state 202. If the end of frame has been reached, the state machine 200 moves to the state 230. In the state 230, the state machine 200 marks the current exposure as done with frame A and moves to the state 232. In the state 232, the state machine 200 determines whether the last exposure has been reached. If the last exposure has not been reached, the state machine 200 moves to the state 234. If the last exposure has been reached, the state machine 200 moves to the state 236. In the state 234, the state machine 200 performs a Swap Exposure operation and moves to the state 202. In an example, the Swap Exposure operation advances to the next exposure (e.g., i=(i+1)/E, where i is the index of the current exposure and E is the total number of exposures). In the state 236, the state machine 200 advances to the next frame and sets the memory pointers (e.g., channel parameters) for the active frame (e.g., Region A) equal to the memory pointers (e.g., channel parameters) for the previous frame (e.g., Region B), then moves to the state 234.

In an example, a pointer is set to the current address in the memory 104 that is used to store both Frame A and Frame B. The row increment operations adjust the pointer by the frame_width so that the next store is properly placed and normal stores (e.g., associated with store line operations) just increment the pointer as pixels are stored out to memory. In the two exposure case, when frame A is completely done (e.g., all exposures have hit EOF), the processor 102 copies the pointer information associated with Frame B (or Frame N+1) to the pointer(s) for Frame A (replacing the information for Frame N as the active frame). In general, all of the bookkeeping for Frame B is copied to Frame A because Frame A is no longer active and the Frame A bookkeeping is no longer needed. From this point on, Frame_A is now Frame N+1 and Frame B is Frame N+2.

Referring to FIG. 8, a diagram of a camera system 900 is shown illustrating an example implementation of a computer vision system in accordance with an embodiment of the invention. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 7.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be a high dynamic range (HDR) image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera 60. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera 60.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930, a number of blocks (or circuits) 932, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. The number of circuits 930 may be processor circuits. In various embodiments, the circuits 930 may include one or more embedded processors (e.g., ARM, etc.). The circuits 932 may implement a number of computer vision related coprocessor circuits. In an example, one or more of the circuits 932 may implement a two-stage object detection engine in accordance with an example embodiment of the invention. The circuit 934 may be a digital signal processing (DSP) module. In some embodiments, the circuit 934 may implement separate image DSP and video DSP modules. The circuit 936 may be a storage interface. The circuit 936 may interface the processor/camera circuit 902 with the DRAM 916, the non-volatile memory 918, and the removable media 920.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. The circuit 940 may implement a sensor input (or interface). The circuit 942 may implement one or more control interfaces including but not limited to an inter device communication (IDC) interface, an inter integrated circuit (I²C) interface, a serial peripheral interface (SPI), and a pulse width modulation (PWM) interface. The circuit 944 may implement an audio interface (e.g., an I²S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 930 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the coprocessors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I²S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 952 may also include support for communicating using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.).

The functions and structures illustrated in the diagrams of FIGS. 1 to 10 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to store data, said memory comprising a first memory buffer and a second memory buffer, said first and said second memory buffers being independent of each other; and
   a processor configured to (a) receive a high dynamic range (HDR) image data stream and (b) store image data for a plurality of HDR image frames of said HDR image stream in said memory, wherein (i) each of said plurality of HDR image frames comprises a plurality of exposure regions having different exposure levels, (ii) said processor issues write commands to store said image data of all of the exposure regions for a particular HDR image frame in one of the memory buffers, and (iii) said processor issues row increment commands during one or both of blanking periods and sensor overlap regions of said HDR image frames based upon symbols in said HDR image data stream.

2. The apparatus according to claim 1, wherein said processor is further configured to store image data received for each of said exposure regions having active data and perform a row increment operation for exposure regions not having said active data.

3. The apparatus according to claim 1, further comprising a high dynamic range sensor configured to generate said HDR image data stream comprising said image data of said plurality of exposure regions for each of said plurality of HDR image frames and said symbols identifying a beginning and an end of each exposure.

4. The apparatus according to claim 1, wherein said sensor overlap regions compensate for temporal offsets between when said processor receives respective first rows of said exposure regions.

5. The apparatus according to claim 1, wherein said processor is further configured to blend said plurality of exposure regions of each of said plurality of HDR image frames to produce a respective high dynamic range image.

6. The apparatus according to claim 5, wherein storing said plurality of exposure regions of said plurality of HDR image frames and blending said plurality of exposure regions of each of said plurality of HDR image frames to produce said respective high dynamic range image are performed at different times.

7. The apparatus according to claim 1, wherein said processor comprises a digital signal processor.

8. The apparatus according to claim 1, wherein said memory and said processor are implemented as a single integrated circuit.

9. The apparatus according to claim 1, wherein said memory and said processor are implemented as a plurality of integrated circuits.

10. The apparatus according to claim 1, wherein said memory and said processor are implemented as part of at least one of a computer vision system, a high dynamic range camera, or an autonomous vehicle.

11. A method of storing image data comprising:
configuring a memory to comprise a first memory buffer and a second memory buffer, said first and said second memory buffers being independent of each other; and
storing image data for a plurality of high dynamic range (HDR) image frames of an HDR image data stream in said memory, wherein (i) each of said HDR image frames comprises a plurality of exposure regions having different exposure levels, (ii) said image data of all of the exposure regions for a particular HDR image frame is stored in one of the memory buffers by performing a write operation, and (iii) ensuring address accounting during one or both of blanking periods and sensor overlap regions of said HDR image data stream by performing a row increment operation based upon symbols in said HDR image data stream identifying a beginning and an ending of each exposure.

12. The method according to claim 11, wherein said image data received is stored for each of said exposure regions having active data and said row increment operation is performed for exposure regions not having active data.

13. The method according to claim 11, wherein said HDR image data stream is received from a high dynamic range sensor configured to generate said HDR image data stream comprising said image data of said plurality of exposure regions for each of said plurality of HDR image frames and said symbols identifying a beginning and an end of each exposure.

14. The method according to claim 11, wherein said sensor overlap regions compensate for temporal offsets between when respective first rows of said exposure regions are received.

15. The method according to claim 11, further comprising blending said plurality of exposure regions of each of said plurality of HDR image frames to produce a respective high dynamic range image.

16. The method according to claim 15, wherein storing said plurality of exposure regions of each of said plurality of HDR image frames and blending said plurality of exposure regions of each of said plurality of HDR image frames to produce said respective high dynamic range image are performed at different times.

17. The method according to claim 11, wherein a digital signal processor is used to receive said HDR image data stream and manage said memory buffers.

18. The method according to claim 17, wherein said memory and said digital signal processor are implemented as a single integrated circuit.

19. The method according to claim 17, wherein said memory and said digital signal processor are implemented as a plurality of integrated circuits.

20. The method according to claim 17, wherein said memory and said digital signal processor are implemented as part of at least one of a computer vision system, a high dynamic range camera, or an autonomous vehicle.

* * * * *